United States Patent
del Puerto Camargo et al.

(10) Patent No.: US 9,676,304 B2
(45) Date of Patent: Jun. 13, 2017

(54) VEHICLE SEAT WITH RAMP FOR FACILITATING ISO FIX CHILD SEAT INSTALLATION

(71) Applicant: FORD GLOBAL TECHNOLOGIES, LLC, Dearborn, MI (US)

(72) Inventors: Raul Emilio del Puerto Camargo, Mexico City (MX); David Eduardo Banales Cano, Tultepec (MX); Daniel Sangines Vazquez, Mexico City (MX); Steven Walter Nunez, South Lyon, MI (US); Peter Curran, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 14/552,684

(22) Filed: Nov. 25, 2014

(65) Prior Publication Data

US 2016/0144753 A1    May 26, 2016

(51) Int. Cl.
| | |
|---|---|
| *B60N 2/26* | (2006.01) |
| *B60N 2/28* | (2006.01) |
| *B60N 2/01* | (2006.01) |
| *B60N 2/64* | (2006.01) |

(52) U.S. Cl.
CPC .............. *B60N 2/2887* (2013.01); *B60N 2/01* (2013.01); *B60N 2/26* (2013.01); *B60N 2/643* (2013.01); *B60N 2/646* (2013.01); *B60N 2205/35* (2013.01)

(58) Field of Classification Search
CPC .......... B60N 2/2887; B60N 2/01; B60N 2/26; B60N 2/646; B60N 2/643

USPC .......................................................... 297/253
See application file for complete search history.

(56) References Cited

U.S. PATENT DOCUMENTS

| | | | |
|---|---|---|---|
| 6,322,141 B1 * | 11/2001 | Dutkievic ............ | B60N 2/2893 297/253 |
| 6,371,516 B1 | 4/2002 | Miyagawa | |
| 6,481,800 B2 * | 11/2002 | Duncan ................ | B60N 2/2806 297/253 X |
| 6,601,917 B1 * | 8/2003 | Christopherson .... | B60N 2/2821 297/253 X |
| 6,623,074 B2 | 9/2003 | Asbach et al. | |
| 7,322,648 B2 | 1/2008 | Nakagawa et al. | |

(Continued)

FOREIGN PATENT DOCUMENTS

| | | |
|---|---|---|
| CN | 103386904 A | 11/2013 |
| DE | 10351753 A1 | 6/2005 |
| EP | 2161160 A1 | 3/2010 |

(Continued)

OTHER PUBLICATIONS

English machine translation of CN103386904.

(Continued)

*Primary Examiner* — Anthony D Barfield
(74) *Attorney, Agent, or Firm* — Vichit Chea; King & Schickli, PLLC (57) ABSTRACT

A vehicle seat includes a seatback and a seat bottom having a seating surface. A child car seat anchoring system is provided behind the vehicle seat and extends between the seatback and seat bottom. A guide ramp on the seat bottom is aligned with an anchor point of the child car seat anchoring system to aid an individual in connecting a child car seat to the child car seat anchoring system.

12 Claims, 6 Drawing Sheets

(56) References Cited

U.S. PATENT DOCUMENTS 7,789,462 B2 * 9/2010 Glover ................. B60N 2/2893
297/253 X

FOREIGN PATENT DOCUMENTS

| EP | 2272709 A2 | 1/2011 |
| EP | 2261076 B1 | 8/2012 |
| EP | 2774804 A1 | 9/2014 |
| WO | 2005123447 A1 | 12/2005 |

OTHER PUBLICATIONS

English machine translation of DE10351753.
English machine translation of EP2261076.
Photographs of ISO Fix Systems.

* cited by examiner

VEHICLE SEAT WITH RAMP FOR FACILITATING ISO FIX CHILD SEAT INSTALLATION

TECHNICAL FIELD

This document relates generally to the vehicle equipment field and, more particularly, to a vehicle seat equipped with one or more ramps to facilitate installation of a child seat utilizing a child car seat anchoring system such as the ISO fix child car seat anchoring system.

BACKGROUND

ISO fix is the international standard for attachment points for child car seats in passenger vehicles. In accordance with this system, the child car seat is secured with a single attachment at the top by means of a top tether and two attachments at the base of each side of the child car seat. More specifically, the child car seat is equipped with two anchoring clips at the base which engage one or more anchor wires of a child car seat anchoring system secured to the floor pan of the vehicle behind the rear seat. This document relates to a vehicle seat incorporating a new and improved ramp system wherein guide ramps are aligned with the child car seat anchor points to allow more easy and convenient installation of the child car seat.

SUMMARY

In accordance with the purposes and benefits described herein, a vehicle seat is provided. That vehicle seat includes a seat back, a seat bottom, including a seating surface, and a guide ramp on the seat bottom aligned with a child seat anchor point of a child car seat anchoring system. In one possible embodiment the vehicle seat further includes an indicia on the ramp to help an individual identify the point of attachment for a child car seat to the child car seat anchoring system which is hidden from view by the seatback and seat bottom. That ramp may be made from nylon or other low friction plastic material with a scratch resistant texture.

In one possible embodiment, the seat bottom includes a car seat foam and a car seat trim cover covering the foam and forming the seating surface.

In one possible embodiment, the guide ramp further includes a snap bezel wherein the guide ramp and snap bezel are secured together to capture a portion of the car seat trim cover therebetween and secure the guide ramp in a desired position on the seat bottom.

In one possible embodiment, the guide ramp includes a projecting mounting skirt and the snap bezel includes a cooperating mounting flange. The guide ramp is secured to the snap bezel with the mounting skirt nesting in the mounting flange. A plurality of snap tabs on the snap bezel mounting flange are aligned with and engage a plurality of openings in the mounting skirt to complete the connection.

In one possible embodiment, the guide ramp includes a bottom face and the snap bezel includes an upper face. When the guide ramp is connected to the snap bezel, the bottom face nests on the upper face and the mounting skirt nests in the mounting flange.

A plurality of pointed projections or teeth are provided on one of the upper face and the bottom face. Further, the seat bottom includes a seat foam and a seat trim cover. The seat trim cover includes a plurality of trim cover slots. One guide ramp is received and held in each trim cover slot. More specifically, the guide ramp is held in the slot by capturing a margin of the seat cover around the slot between the bottom face of the ramp and the upper face of the snap bezel. The plurality of pointed projections or teeth engage the margin of the seat cover to insure the connection.

In one possible embodiment, the guide ramp includes an open channel having a smooth low friction surface. Further in one possible embodiment, the guide ramp has a rounded entry end.

In accordance with an additional aspect, a method of improving child car seat installation to a child car seat anchoring system in a motor vehicle comprises providing a guide ramp on a vehicle seat aligned with an anchor point of the child car seat anchoring system wherein the guide ramp includes a channel leading to the anchor point. In accordance with yet another aspect, the method includes displaying an indicia on the guide ramp to help an individual identify the point of attachment for a child car seat to the child car seat anchoring system.

In the following description, there are shown and described several preferred embodiments of the vehicle seat. As it should be realized, the vehicle seat is capable of other, different embodiments and its several details are capable of modification in various, obvious aspects all without departing from the vehicle seat as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle seat and together with the description serve to explain certain principles thereof. In the drawing figures.

Reference will now be made in detail to the present preferred embodiments of the vehicle seat, examples of which are illustrated in the accompanying drawing figures.

DETAILED DESCRIPTION

Figure 1:
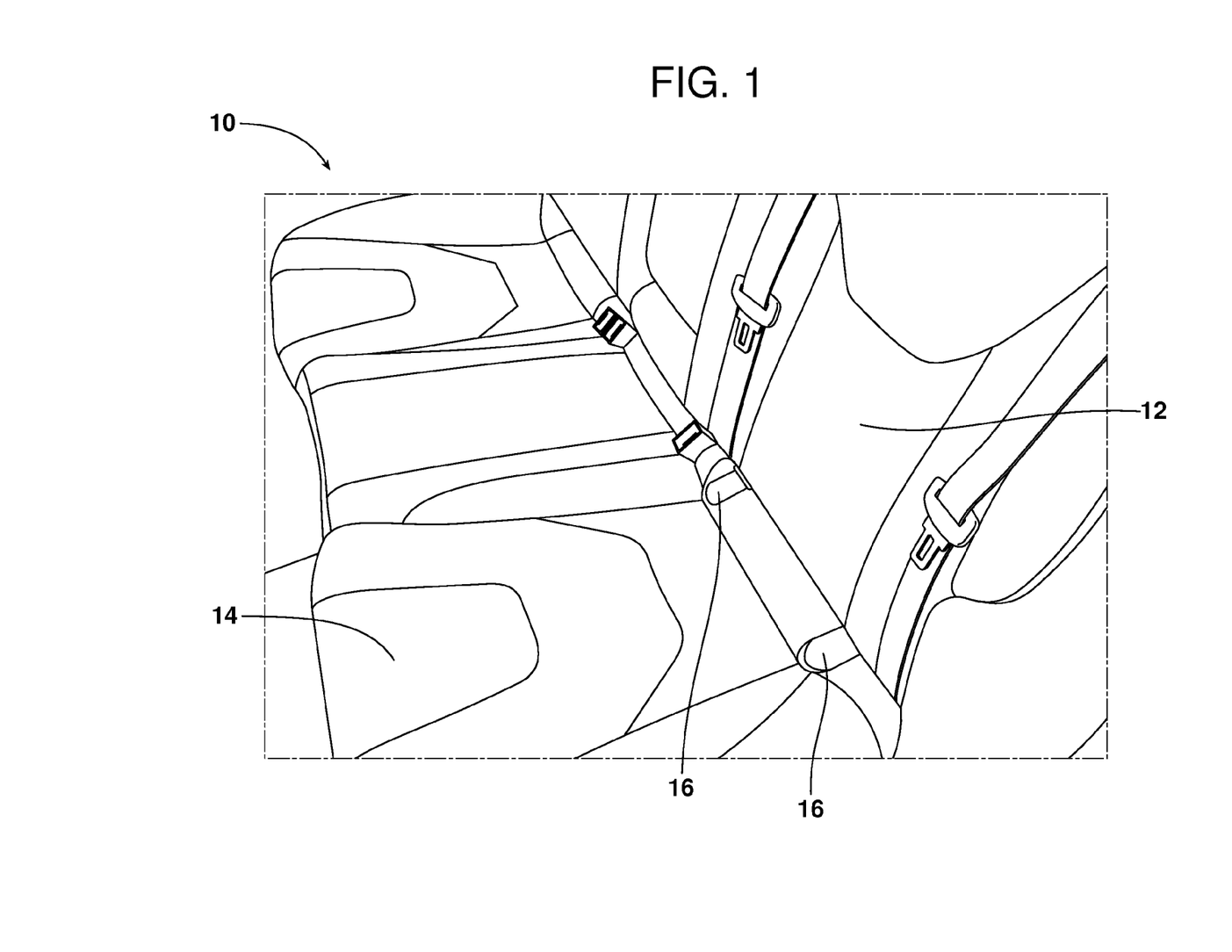
FIG. 1 is a perspective view of the vehicle seat clearly showing the guide ramps on the seat bottom which are aligned with the child car seat attachment points of the child car seat anchoring system which is hidden from view in this figure by the seatback and seat bottom of the vehicle seat.

Reference is now made to FIG. 1 illustrating the vehicle seat 10 including a seatback 12 and a seat bottom 14. In the illustrated embodiment, a plurality of ramps 16 are provided at spaced locations on the seat bottom 14 where they facilitate simple and convenient connection of a child car seat to the attachment points of an ISO fix child car seat anchoring system that is hidden from view behind the seat 10 in FIG. 1. More specifically, two ramps 16 are illustrated in FIG. 1 at one side of the seat 10 to allow connection of one child car seat. It should be appreciated that two more ramps 16 could be provided at the opposite side of the seat to allow connection of a second car seat if desired.

Figure 2:
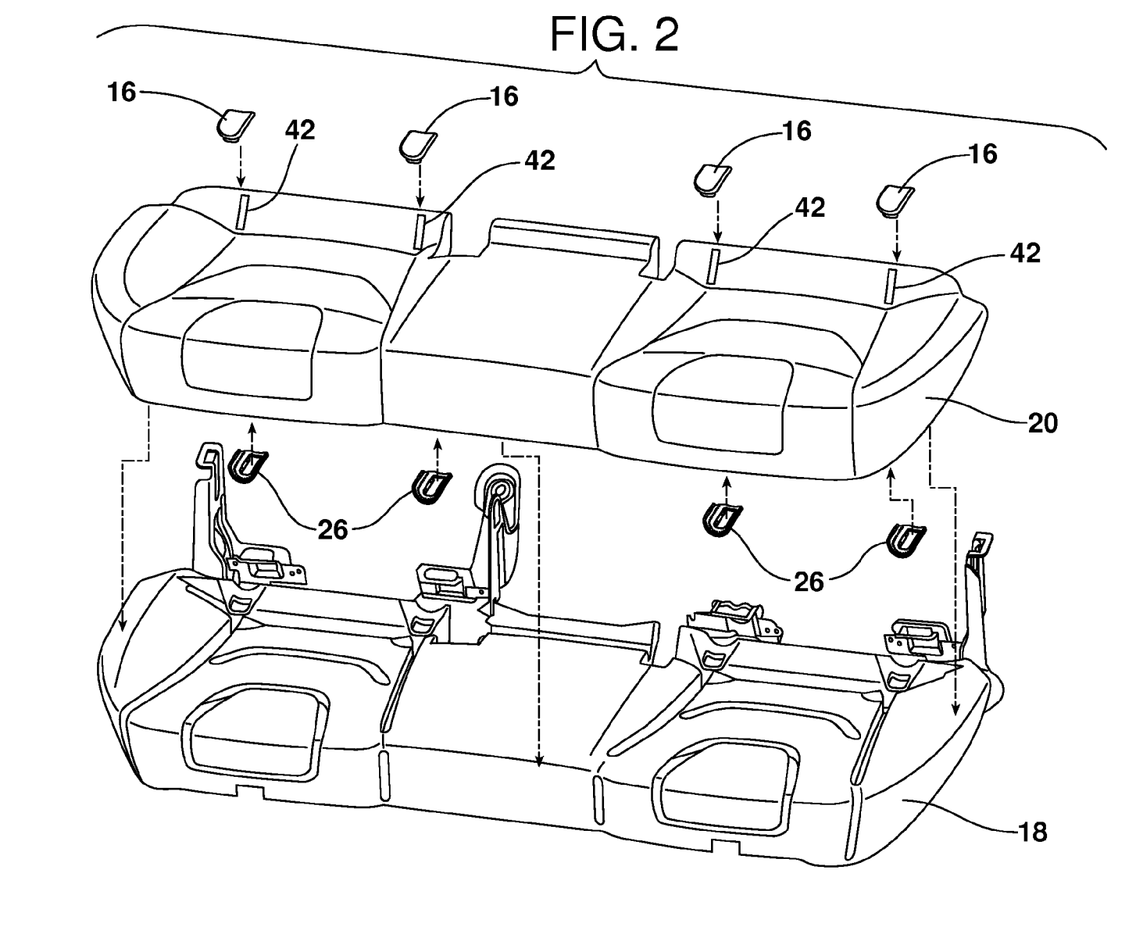
FIG. 2 is an exploded perspective view of the seat bottom and guide ramp as well as the child car seat anchoring system accessed by means of the aligned guide ramps.

Reference is now made to FIG. 2. As shown, the seat bottom 14 includes a car seat foam 18 and a car seat trim cover 20 that is secured to and covers the foam and also forms the seating surface of the seat bottom.

Figure 3A:
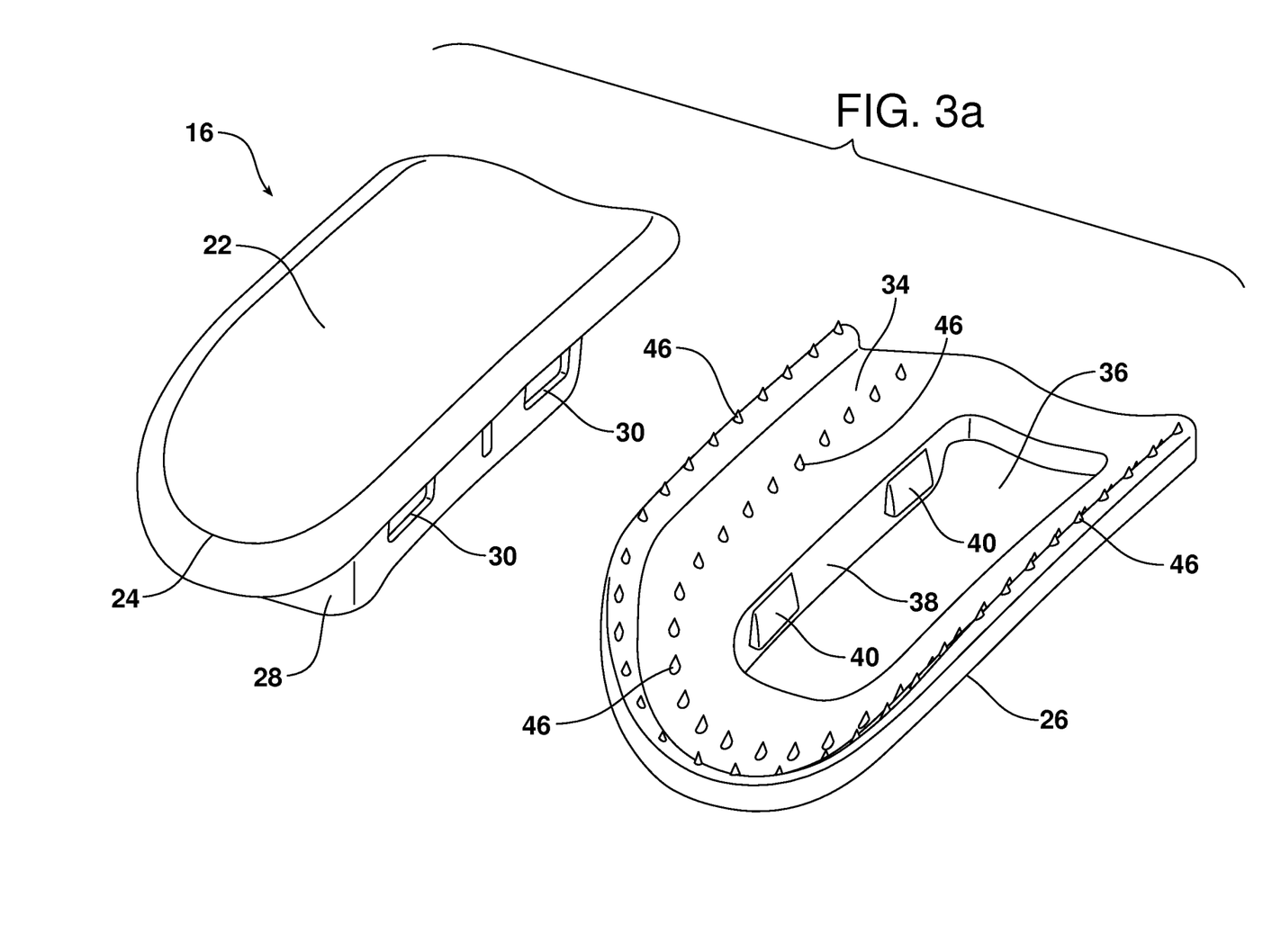
FIG. 3*a* is a perspective view of a cooperating guide ramp and snap bezel from above.
Figure 3B:
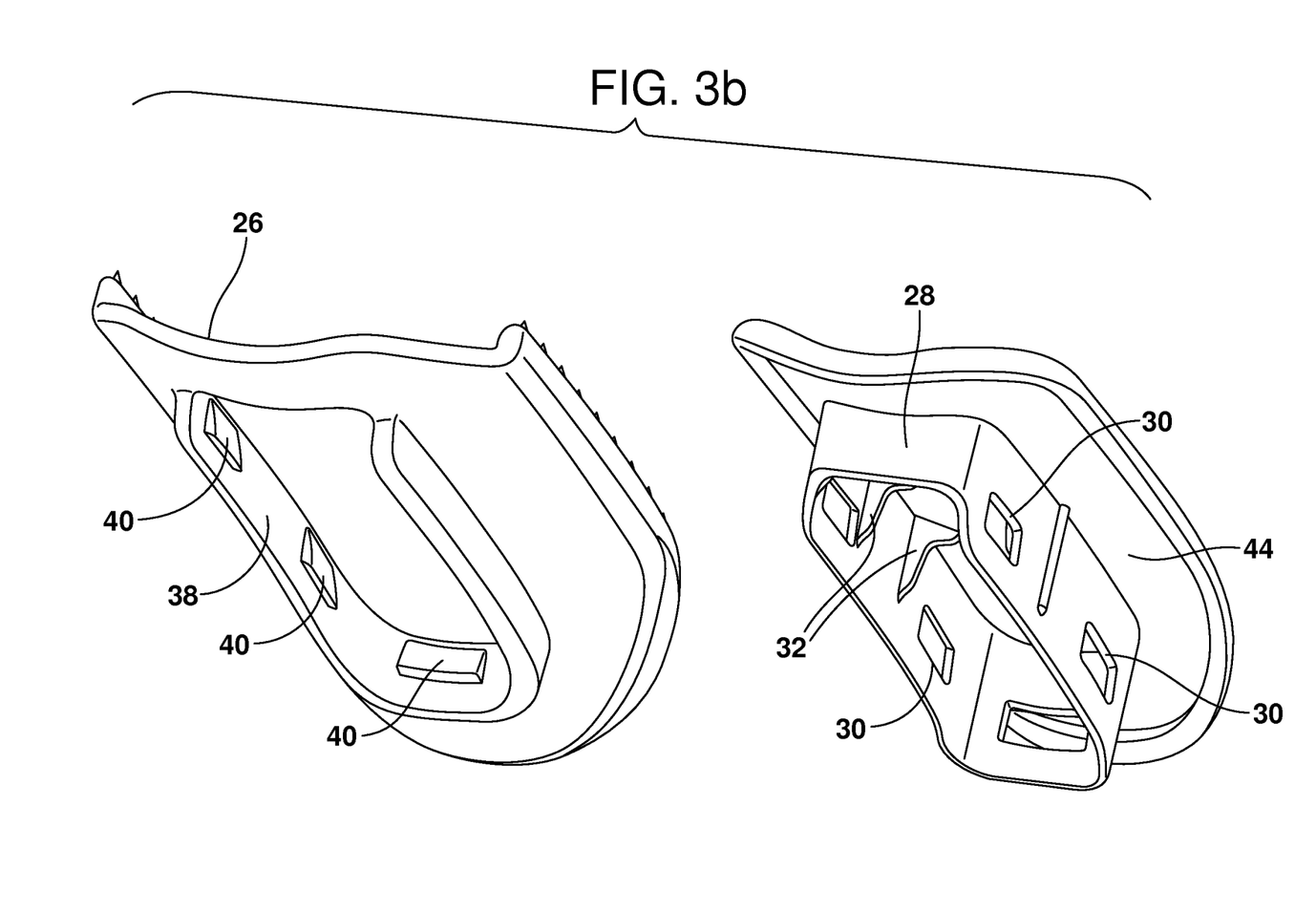
FIG. 3*b* is a perspective view of the cooperating guide ramp and snap bezel from below.

As illustrated in FIGS. 3a and 3b, each guide ramp 16 includes an upper face having an open top channel 22 with a rounded entry end 24. Advantageously, an open top channel 22 readily receives the attachment arms A of a child car seat S thereby requiring little manipulation of a heavy child car seat S by the user. Such a structure is also simple and inexpensive to produce. Further, it has no moving parts which could break over time. Each ramp 16 may be molded from nylon or other appropriate material. Advantageously, nylon provides a durable, low friction surface for the channel 22 that functions particularly efficiently when an individual is utilizing the ramps 16 to connect a child car seat to a child car seat anchoring system in a manner that will be described below.

As further illustrated in FIGS. 3a and 3b, each ramp 16 also includes a snap bezel 26. While the upper face of the ramp 16 includes the channel 22, the lower face includes a projecting mounting skirt 28 including a series of spaced openings 30. A plurality of gussets 32 reinforce the mounting skirt 28 at spaced locations between the openings 30.

The snap bezel 26 includes a curved upper face 34, a central opening 36 for receiving the mounting skirt 28 of the ramp 16 and a cooperating mounting flange 38 that extends at least partially around the perimeter of that opening. The mounting flange 38 includes a plurality of snap tabs 40.

As illustrated in FIG. 2, the car seat trim cover 20 includes a plurality of trim cover slots 42 provided at spaced locations for receiving the ramps 16.

Each ramp 16 is mounted on the car seat trim cover 20 at a slot 42 by aligning a ramp with a slot, pressing a ramp against the trim cover 20 so that the mounting skirt 28 of the ramp extends through the slot and then positioning a snap bezel 26 onto the mounting skirt 28 on the underside of the car seat trim cover so that the ramp 16 nests in the curved upper face 34 of the bezel with the mounting bracket 28 received in the central opening 36. When the ramp 16 is fully seated in the bezel 26, the snap tabs 40 are received in the openings 30.

When properly connected, the ramp 16 is secured in position on the car seat trim cover 20 in several ways. More specifically, the margin of the car seat trim cover 20 surrounding the slot 42 is captured between the curved bottom face 44 of the ramp 16 and the curved upper face 34 of the bezel 26. Spaced teeth/pointed projections 46 on the curved upper face 34 of the bezel 26 serve to grip the margin of the car seat trim cover 20 to securely hold the ramp 16 in the desired position on the car seat trim cover. The cooperating snap tabs 40 on the mounting flange 38 of the snap bezel 26 engage in the openings 30 in the mounting skirt 28 of the ramp 16 so as to prevent the ramp 16 from coming loose from the snap bezel and complete the connection.

Figure 4A:
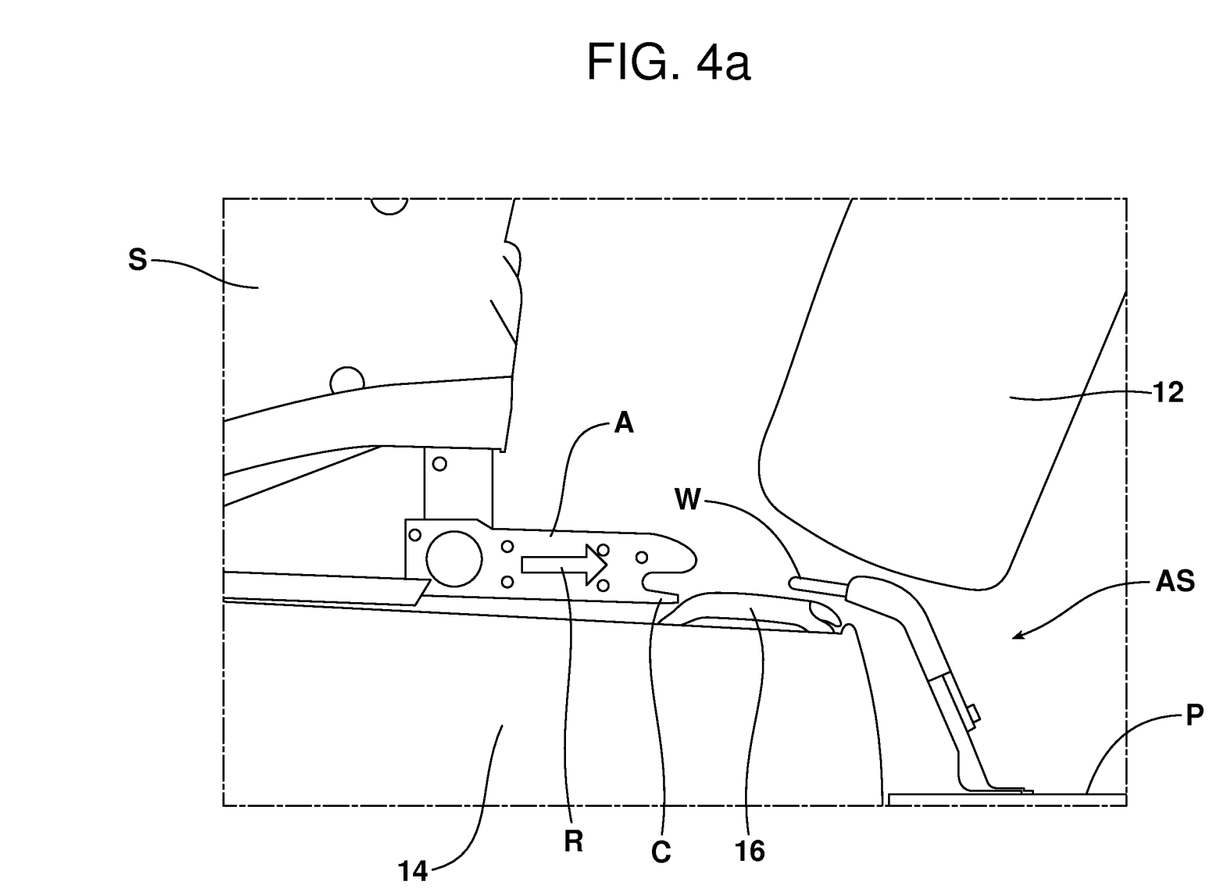
FIGS. 4*a* and 4*b* are schematic illustrations showing how an individual utilizes a guide ramp to align the attachment of a child seat for simple and convenient connection to a child car seat attachment point of a child car seat anchoring system that is substantially hidden from view by the seatback and seat bottom of the vehicle seat.
Figure 4B:
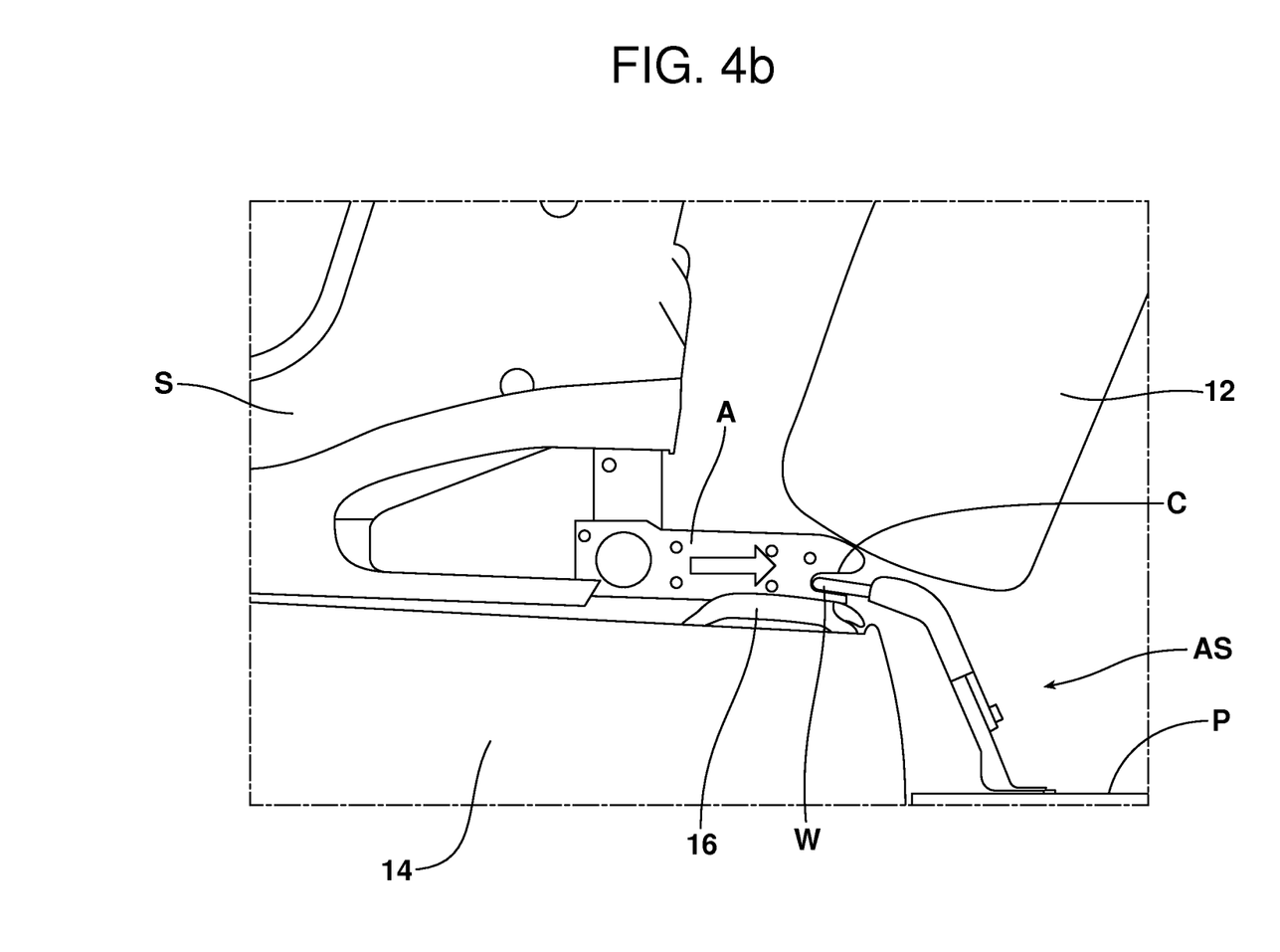

Reference is now made to FIGS. 4a and 4b illustrating how a child car seat S is attached to the child car seat anchoring system AS that is hidden from view between the seatback 12 and seat bottom 14. As should be appreciated, that anchoring system AS includes a mounting bracket M that is fixed to the vehicle floor pan P and an anchor wire W that functions as a child car seat anchor point.

More specifically, the child seat S includes two attachment arms A at the base of the child seat S (only one illustrated in these drawing figures, the other being at the opposite side of the child seat directly behind the one in the illustration). The two ramps 16 are spaced apart the same distance as the attachment arms A on the child seat S and are aligned with the child seat attachment points/anchor wires W of the anchoring system AS secured to the vehicle body P behind the vehicle seat 10. When an individual wishes to connect a child seat S to the anchoring system AS, the attachment arms A are positioned on the ramps 16. The open top channels help one to quickly find and position the arms A on the ramps 16. The individual then pushes the child seat S rearwardly in the direction of action arrow R so that the latch C at the end of each attachment arm A is fully engaged with the attachment point/anchor wire W positioned behind the vehicle seat 10 and aligned with the ramps 16. The ramps 16 are constructed from a low friction material such as nylon so that the arms A slide easily along the ramps thereby allowing one to quickly and easily attach the child S to the anchoring system AS. As a further aid to the individual, an appropriate indicia 52 may be provided on the face of the ramp 16 or on the seatback 12 or seat bottom 14 adjacent the ramp to help the individual identify the point of attachment for the child seat S to the child car seat anchoring system AS.

The foregoing has been presented for purposes of illustration and description. It is not intended to be exhaustive or to limit the embodiments to the precise form disclosed. Obvious modifications and variations are possible in light of the above teachings. For example, in the illustrated embodiment spaced teeth or pointed projections 46 are provided on the snap bezel 26. In an alternative embodiment those teeth/projections may be provided on the bottom surface 44 of the ramp 16 or even in both positions. All such modifications and variations are within the scope of the appended claims when interpreted in accordance with the breadth to which they are fairly, legally and equitably entitled.

What is claimed:

1. A vehicle seat that facilitates connection of a child car seat to a child car seat anchor point of a child car seat anchoring system, comprising:
    a seat back;
    a seat bottom including a seating surface; and
    a guide ramp on said seat bottom aligned with the anchor point of the child car seat anchoring system, wherein said guide ramp includes a bottom face, a snap bezel and a projecting mounting skirt, wherein said snap bezel includes an upper face and a central opening receiving said projecting mounting skirt and a mounting flange extending around at least a portion of a periphery of said central opening, wherein said projecting mounting skirt includes a plurality of openings and said mounting flange includes a plurality of snap tabs received in said plurality of openings and securing said guide ramp and said snap bezel together, and wherein said bottom face nesting on said upper face and said mounting skirt nesting in said mounting flange when said ramp is connected to said snap bezel.

2. The vehicle seat of claim 1, further including a plurality of support gussets on said mounting skirt between said openings.

3. The vehicle seat of claim 1, further including a plurality of projections on one of said upper face and said bottom face.

4. The vehicle seat of claim 3, wherein said seat bottom includes a seat foam and a seat trim cover.

5. The vehicle seat of claim 4, wherein said vehicle seat includes a plurality of guide ramps and said seat trim cover includes a plurality of trim cover slots wherein one of said guide ramps is received and held in each of said trim cover slots.

6. The vehicle seat of claim 5, wherein a margin of said seat trim cover around each of said plurality of trim cover slots is engaged by said plurality of projections and captured between said guide ramp and said snap bezel.

7. The vehicle seat of claim 1, wherein said guide ramp includes an open top channel having a smooth low friction surface.

8. The vehicle seat of claim 7, wherein said guide ramp is made from nylon.

9. The vehicle seat of claim 7, wherein said guide ramp has a rounded entry end.

10. The vehicle seat of claim 1, further including an indicia on said guide ramp to help an individual identify said guide ramp as a point of attachment for the child car seat to the child car seat anchoring system.

11. The vehicle seat of claim 1, further including indicia on said seat back or said seat bottom adjacent said guide ramp to help an individual identify said guide ramp as a point of attachment for a child car seat to the child car seat anchoring system.

12. The vehicle seat of claim 1, wherein said guide ramp extends under an anchor point of said child car seat anchoring system.

* * * * *